United States Patent
Kim et al.

(10) Patent No.: US 7,117,179 B2
(45) Date of Patent: *Oct. 3, 2006

(54) METHOD OF RECORDING AND REPRODUCING SAMPLE DATA TO/FROM A RECORDING MEDIUM AND SAMPLE DATA CONTAINING RECORDING MEDIUM

(75) Inventors: Hyung Sun Kim, Seoul (KR); Byung Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

This patent is subject to a terminal disclaimer.

(21) Appl. No.: 10/258,885

(22) PCT Filed: Mar. 12, 2002

(86) PCT No.: PCT/KR02/00425

§ 371 (c)(1),
(2), (4) Date: Oct. 29, 2002

(87) PCT Pub. No.: WO02/073617

PCT Pub. Date: Sep. 19, 2002

(65) Prior Publication Data

US 2003/0179675 A1  Sep. 25, 2003

(51) Int. Cl.
*H04L 9/00* (2006.01)
*G11B 21/08* (2006.01)
(52) U.S. Cl. .................. 705/51; 713/193; 369/30.03
(58) Field of Classification Search ............. 369/53.21, 369/59.25, 275.3, 47.15, 47.22, 47.27, 53.41, 369/84, 30.08, 30.09, 30.19, 30.25
See application file for complete search history.

(56) References Cited

U.S. PATENT DOCUMENTS 5,805,551 A    9/1998  Oshima et al.
6,011,761 A *  1/2000  Inoue .......................... 369/84
6,278,836 B1 * 8/2001  Kawara et al. ............. 380/203
6,351,442 B1 * 2/2002  Tagawa et al. ........... 369/53.41
6,675,179 B1 * 1/2004  Morohashi .................... 369/93
6,889,327 B1 * 5/2005  Inoha ......................... 713/193
2003/0105717 A1* 6/2003  Kim et al. ..................... 705/50

FOREIGN PATENT DOCUMENTS

EP       802527 A1   10/1997
EP       899733 A1    3/1999
EP       911738 A2    4/1999

* cited by examiner

*Primary Examiner*—Thang V Tran
(74) *Attorney, Agent, or Firm*—Lee, Hong, Degerman, Kang & Schmadeka

(57) ABSTRACT

The present invention relates to a method of recording and reproducing sample data to/from a recording medium and a sample data containing recording medium. According to the present invention, contents are recorded on a recording medium with additional sample data which is a part of the contents. And, when the contents of the recording medium are requested to be reproduced, the sample data or all the contents are reproduced based on whether a reproduction approval key is received or not. Owing to the present invention, a user can confirm easily, without purchasing a corresponding reproduction approval key, whether a recording medium such as a DVD-ROM and a DVD-RAM has contents he or she wants.

15 Claims, 6 Drawing Sheets

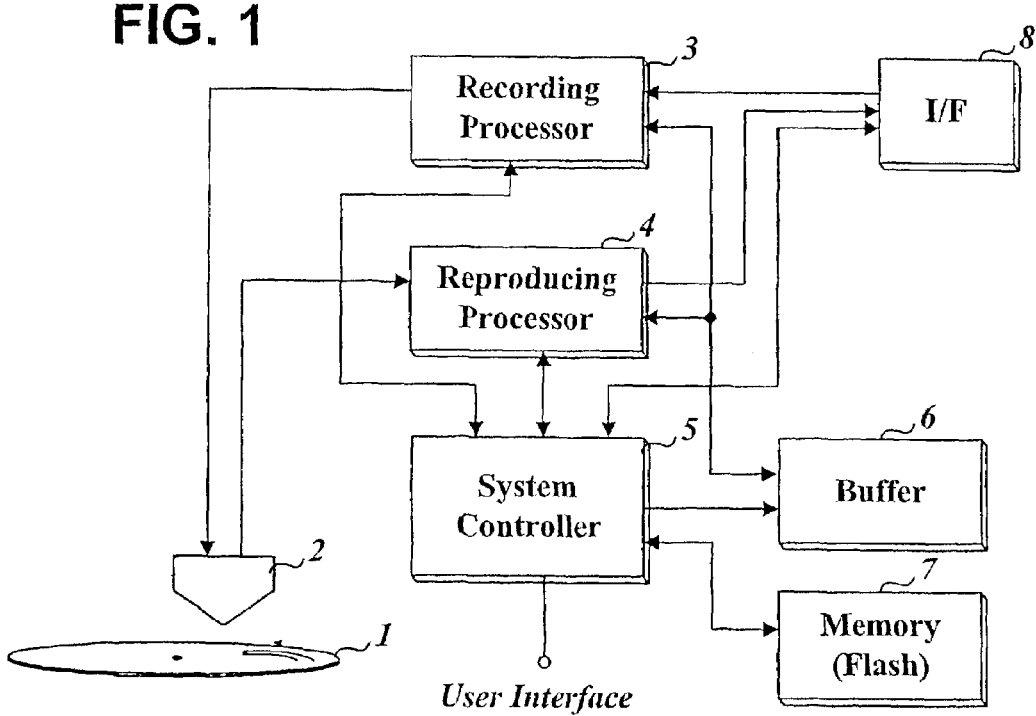

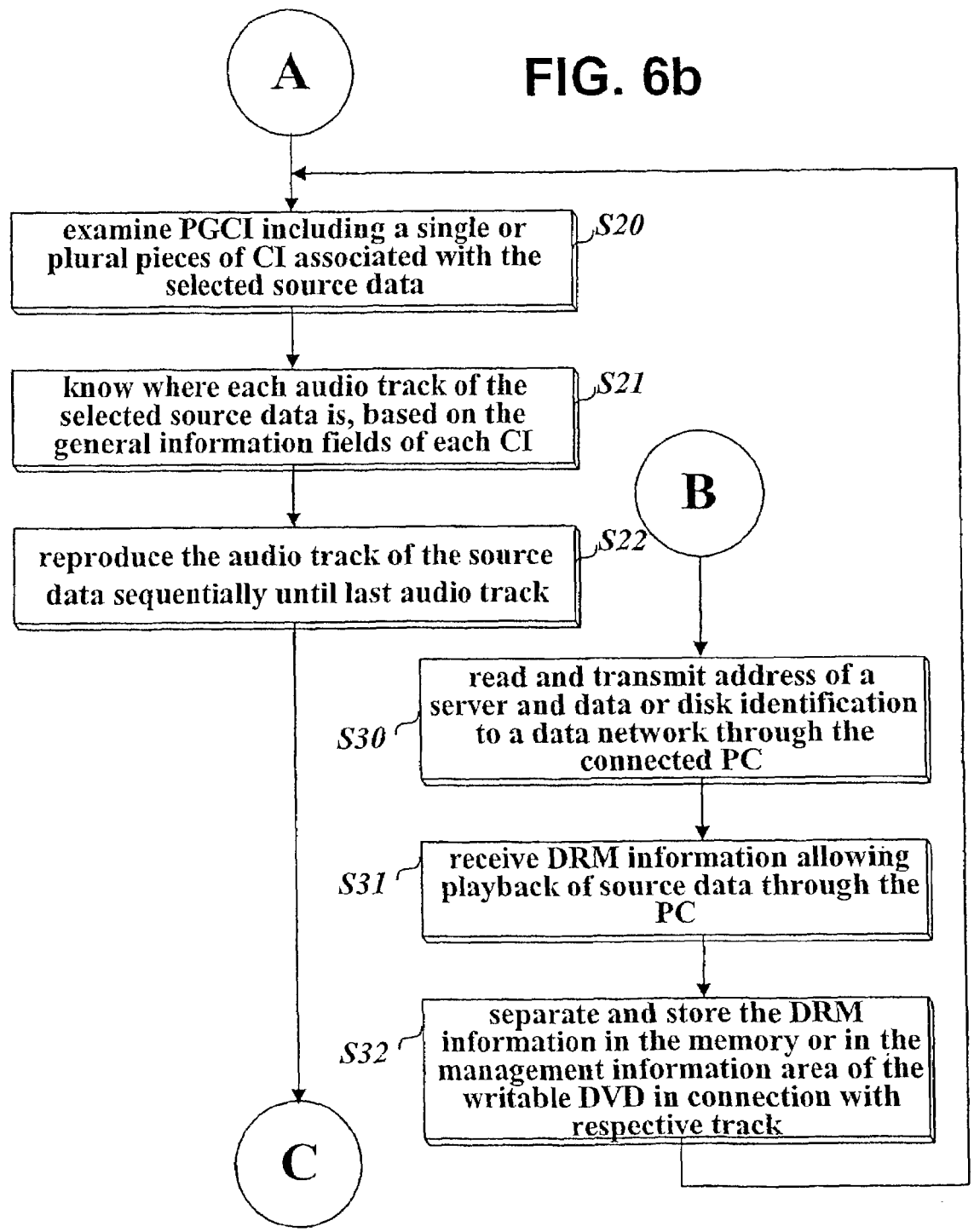

FIG. 7

Playback is not possible because it is not authorized

*If you wants to buy play-authorizing key for selected contents, please connect to www.lgmusic.com or click the below 'download' button* www.lgmusic.com

Download

METHOD OF RECORDING AND REPRODUCING SAMPLE DATA TO/FROM A RECORDING MEDIUM AND SAMPLE DATA CONTAINING RECORDING MEDIUM

1. TECHNICAL FIELD

The present invention relates to a method of recording sample data to a recording medium and a sample data containing recording medium.

The present invention further relates to a method of reproducing entire recorded source data or only short data section containing sample data at a playback request depending on whether the playback is authorized or not.

2. BACKGROUND ART

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

In these days, various types of digital audio data are provided through a data network such as Internet. Such audio data are called EMD (Electronic Music Distribution) audio data. EMD audio data are provided by a lot of contents providers. However, the contents providers encode EMD audio data to mutually different formats and add different unique copy-protection codes to EMD audio data as well to prevent unauthorized copy and protect their copyright.

Therefore, a decoder and a decryption code adequate for downloaded EMD audio data must be obtained from a contents provider having provided the EMD audio data before playing the downloaded EMD audio data. The decryption code is used for decrypting EMD audio data encrypted with a corresponding copy-protection code.

Because it is nearly impossible to obtain both a suitable decryption code and a decoder without lawful approval, EMD audio data can be protected against unauthorized copy, thus its copyright can be protected well.

As mentioned before, because a large-capacity recording medium is being commercialized and anti-piracy of EMD audio data becomes possible, it is expected that EMD audio data are spread greatly over a data network in the near future.

However, EMD audio data, in general, are entirely encrypted with a copy-protection code. Therefore, a user can not play any piece of EMD audio data downloaded onto a writable DVD through a disk device before he or she purchases a decryption code. In other words, a user can not confirm at all whether the downloaded EMD audio data are what he or she wants or whether its audio quality is better or not than he or she expected.

Consequently, a user hesitates to buy a play-authorizing code, namely, a decryption code for the downloaded EMD audio data, which would impede spread and distribution of digital audio data through a data network such as Internet.

3. DISCLOSURE OF INVENTION

It is an object of the present invention to provide a method of recording moving picture data and/or audio data onto a recording medium as designating their sample data.

It is another object of the present invention to provide a recording medium on which moving picture data and/or audio data have been recorded wherein their sample data are designated for the recorded moving picture or audio data.

It is another object of the present invention a method of selectively reproducing entire source data recorded on a recording medium or only short data section containing sample data of the source data depending on whether play-authorizing information is obtained A recording medium for storing data in accordance with the present invention is characterized in that it includes a first area for storing data; and a second area for storing management information for the data stored in said first area, wherein source data including at least one data track are recorded in said first area, and wherein location information pointing a data section, a part of the source data, is recorded in said second area, the data section being designated sample data for the source data.

A method of recording data to a recording medium in accordance with the present invention is characterized in that it comprises the steps of: writing received data in a data recording area of a recording medium; checking whether there is play-authorizing information that allows entire playback of the written data; and writing location information pointing a data section, a part of the written data, in a management information area of the recording medium if there is not play-authorizing information, wherein the data section being designated sample data for the source data.

A method of reproducing data from a recording medium in accordance with the present invention is characterized in that it comprises the steps of: checking when play of recorded data is requested, whether or not there is play-authorizing information stored on a recording medium or in a disk device, the play-authorizing information allowing entire playback of the recorded data; reading location information pointing a data section, a part of the recorded data, if there is not play-authorizing information, the data section being designated sample data for the recorded data; and reproducing the data section using the read location information, instead of the recorded data of which play has been requested.

The present invention characterized as above enables a user to confirm whether source data downloaded onto or written on a recording medium such as a writable DVD are what he or she wants without buying play-authorizing information for the source data. Consequently, purchase of play-authorizing information for moving-picture or audio source data is naturally induced from previewing or pre-listening sample data.

4. BRIEF DESCRIPTION OF DRAWINGS

The accompanying drawings, which are included to provide a further understanding of the present invention, illustrate the preferred embodiments of the invention, and together with the description, serve to explain the principles of the present invention, and wherein:

FIG. 1 is a simplified block diagram of an optical disk device in which a data recording/reproducing method of the present invention is embedded;

FIG. 2 is an illustrative format of management information created by a data recording method of the present invention;

FIGS. 6a and 6b are flow charts of an embodiment of a method playing entire or sample data selectively in accordance with the present invention; and FIG. 7 is a screen example where a play-error window is popped up because of no play-authorizing information.

5. MODES FOR CARRYING OUT THE INVENTION

Figure 3:
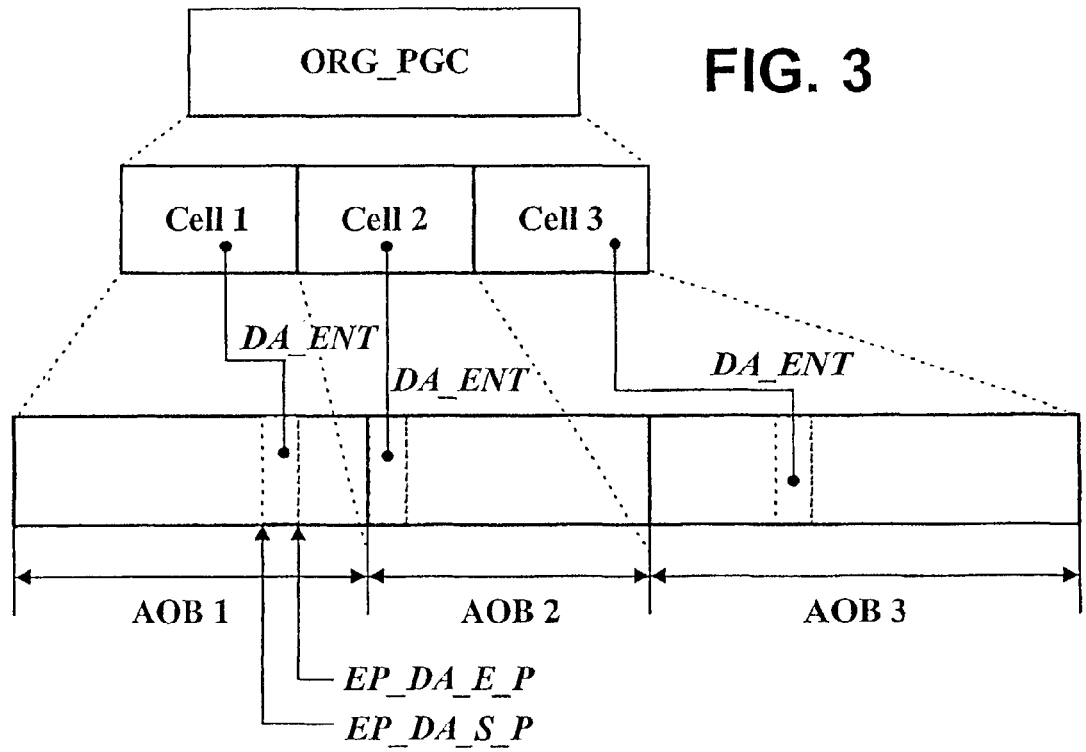
FIG. 3 shows a schematic relation between audio objects including respective sample audio sections therein and their management information formed on a basis of the format of FIG. 2.

In order that the invention may be fully understood, a preferred embodiment thereof will now be described with reference to the accompanying drawings.

FIG. 1 is a simplified block diagram of an optical disk device in which a data recording/reproducing method of the present invention is embedded. The device may be a disk drive installed in a personal computer (PC) being able to connect to Internet.

The disk device of FIG. 1 comprises an interface 8 sending/receiving data to/from an external machine such as a PC; a recording processor 3 converting source data and management information thereof received through the interface 8 to writing signal suitable for a placed writable disk, e.g., DVD-RAM 1; an optical pickup 2 writing the writing signal to the DVD-RAM 1 and reading the written signal therefrom; a reproducing processor 4 processing the read signal to restore to original data; a buffer 6 buffering temporary data produced during recording or reproducing operation; a memory 7, e.g., a flash memory for storing navigation data, which are management information used for reproduction control of recorded data, and Digital Right Management (DRM) information which authorizes play of source data; and a system controller 5 controlling all the elements in record or playback mode, and selecting source or sample data based on the DRM information.

Purchase of the DRM information can be made on-line from a web site on Internet providing associated source data, and it is downloaded into a management information area of the DVD-RAM 1 or into the flash memory 7.

In the meantime, the source data, which may be moving picture or audio data, are downloaded onto the DVD-RAM 1 through Internet or are formed onto a read-only medium such as a DVD-ROM through disk manufacturing process.

If the source data are audio, a single audio track is preferably unitized to an audio object (AOB) that consists of several object units (AOBUs).

In addition, a specific data section is designated to sample data that can be pre-played during record or manufacturing if there is no play authorization.

When audio data are received from a web site on Internet through the interface 8, the system controller 5 records them onto the DVD-RAM 1, and unitizes the recorded audio data to a single logical track. The unitized logical track is managed as a single AOB. A logical track is different from a physical spiral track formed in a writable disk. If recording operation stops after a single audio song provided from outside has been recorded, the recorded song becomes a single logical track (a track means a logical track, hereinafter).

All the audio songs recorded onto the DVD-RAM 1, namely, all tracks are indexed by a track set information called program chain (PGC). Information for a track recorded newly is inserted in the track set information and information for an erased track is deleted from the track set information.

A part of a track (PoT) specified within an audio track by editing process can be reproduced. Such a partial reproduction is initiated through selecting a play list which is used for defining audio track playback order.

After a track has been recorded or edited, cell information (CI) is created to refer to entire or part of a track. The created cell information is written in original or user-defined program chain information (PGCI). A play list is linked with a piece of PGCI through PGCI index number.

As shown in FIG. 2, the PGCI may include plural pieces of CIs. After audio data are recorded on the writable DVD 1 through the recording processor 3, the system controller 5 creates a piece of CI in connection with each track of the recorded data. The created CI consists of Audio Cell General Information 'A_C_GI' and at least one piece of Audio Cell Entry Point Information 'A_C_EPI'. The information 'A_C_GI', as shown in FIG. 2, contains start 'A_C_S_P' and end position information 'A_C_E_P' of the recorded track, namely, AOB.

The cell entry point information can contain different information according to its type defined in a type field 'EP_TY'. The location information on sample audio section according to the present invention is written in this cell entry point information with bit value '0001XXXX' ('X' means 'don't-care') in the type field 'EP_TY'. The cell entry point information with bit value '0001XXXX' in the type field, as shown in FIG. 3, contains start and end position information of sample audio section in the two fields 'EP_DA_S_P' and 'EP_DA_E_P', respectively.

If the field 'EP_TY' of cell entry point information has a value of '0110XXXX', it means that the cell entry point information has only single position information indicating a random accessible point.

Figure 4:
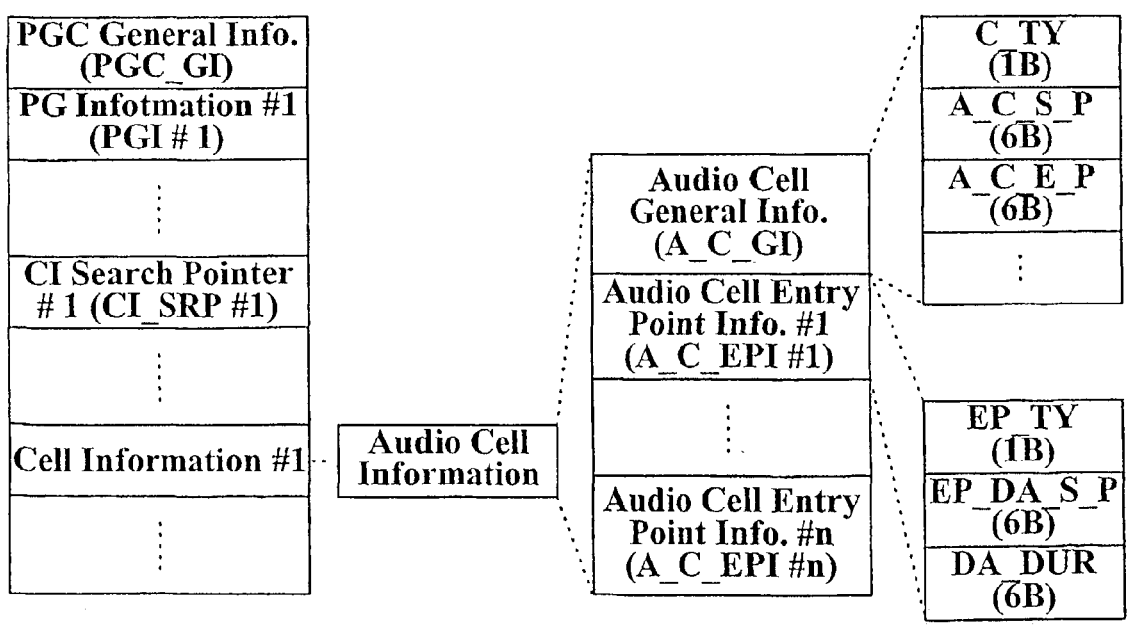
FIG. 4 is another illustrative format of management information created by a data recording method of the present invention.
Figure 5:
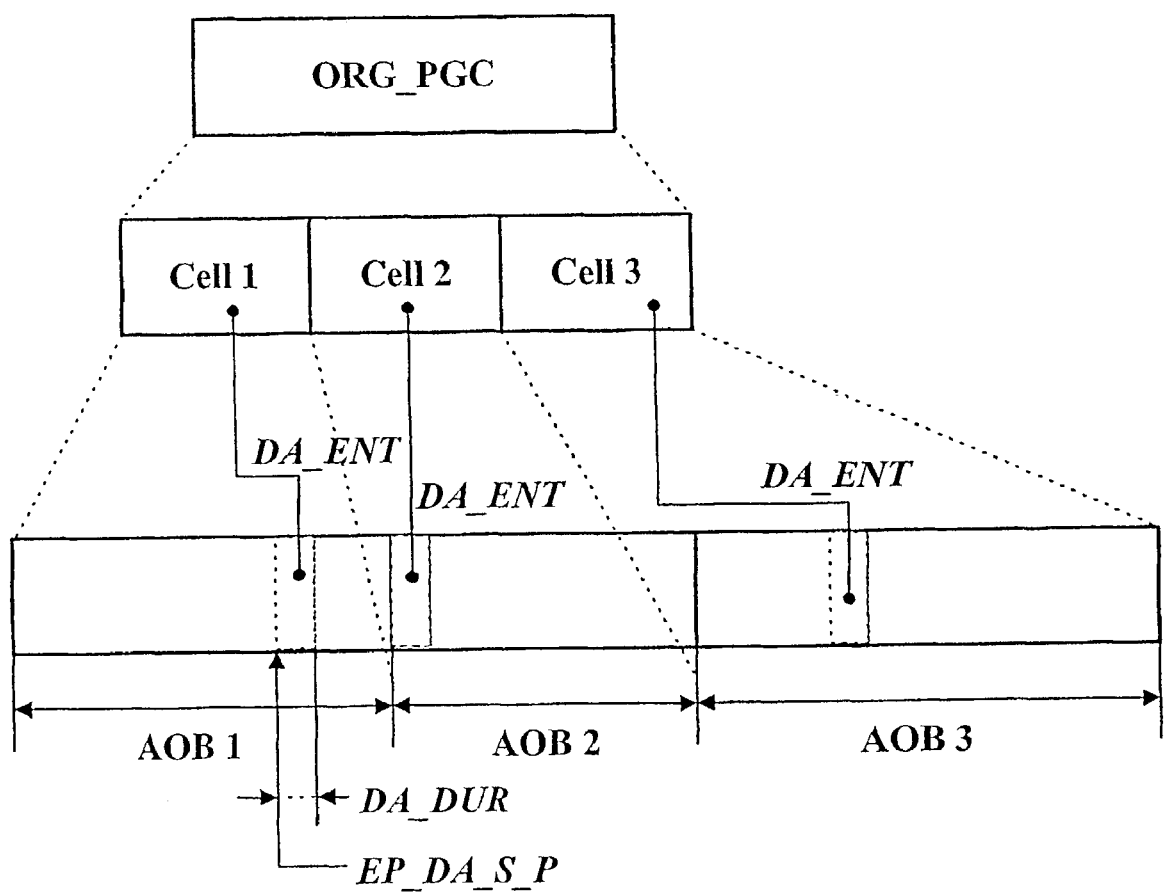
FIG. 5 shows a schematic relation between audio objects including respective sample audio section therein and their management information formed on a basis of the format of FIG. 4.

The audio cell entry point information may include a duration of sample audio section in a field 'DA_DUR' replacing the end point field 'EP_DA_E_P', as shown in FIGS. 4 and 5.

The system controller 5 plays entire source data downloaded onto or written on the DVD-RAM 1 or only sample data thereof with reference to the management information structured as above. The selection of entire source data or sample data thereof is based on whether there is DRM information for the downloaded or written source data.

This selective reproduction method is explained in detail below.

Figure 6A:
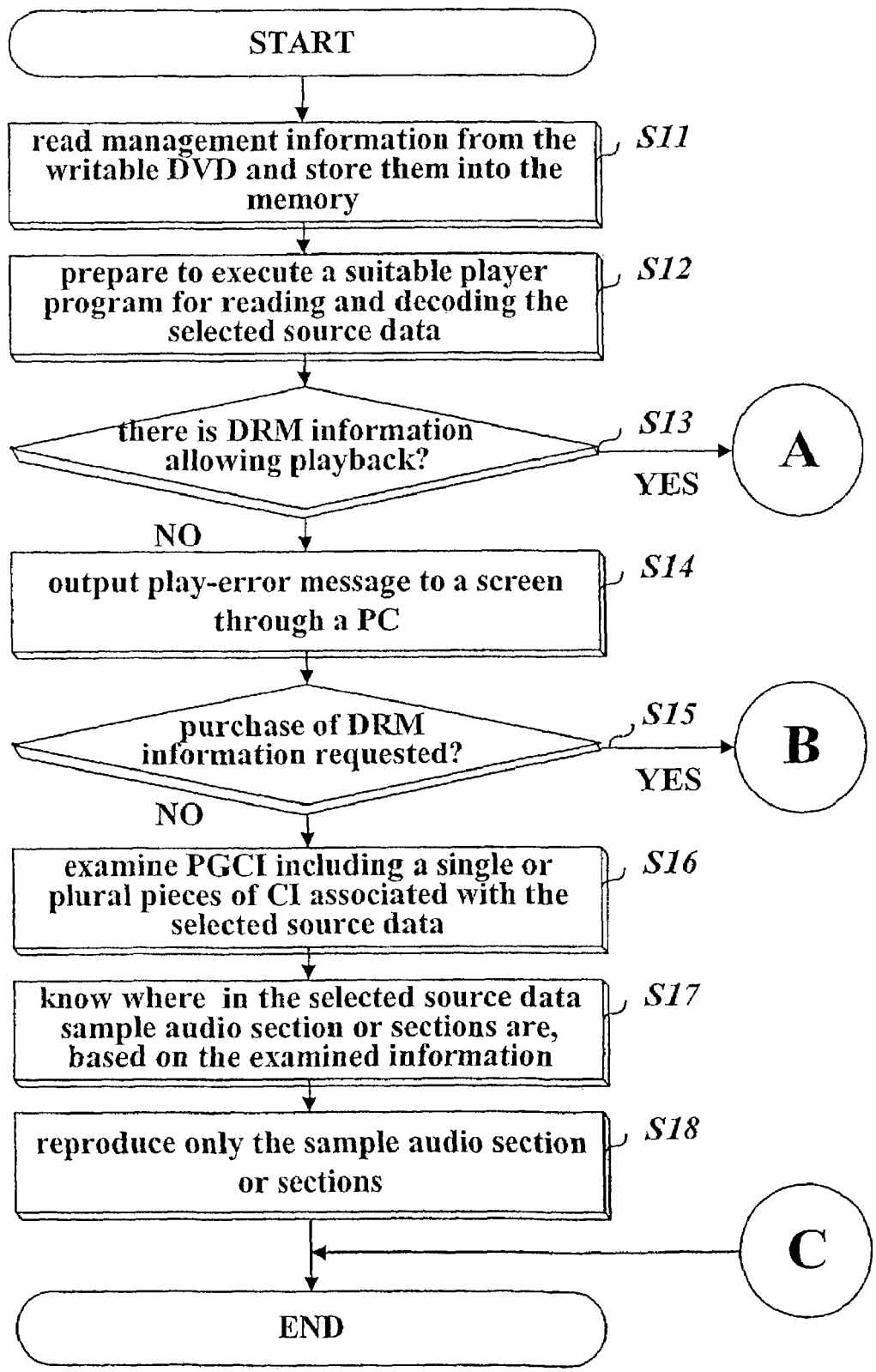

FIGS. 6a and 6b are flow charts of an embodiment of a method playing entire or sample data selectively in accordance with the present invention.

When or before source data are selected to be played back, the system controller 5 reads the above-explained management information, namely, PGCI, CI, and so on from the writable DVD 1 and stores into the flash memory 7 (S11). The source data contains a single track or a plurality of tracks. If necessary, the system controller 5 will execute a suitable player program for reading and decoding the selected source data (S12). Before reading the source data, the system controller 5 checks whether or not there is DRM information allowing playback of the source data in the management area of the DVD-RAM 1 or in the flash memory 7 (S13).

If there is not, the system controller 5 composes a play-error message and sends it to a connected PC (S14). The play-error message includes explanation about DRM information purchase as well as the cause that there is no DRM information related with the selected audio data.

FIG. 7 is a screen example where such a play-error message is outputted. The play-error message displayed in FIG. 7 includes an inquiry window that asks a user whether to buy DRM information or not. The illustrative inquiry window also includes a URL (Uniform Resource Locator) addressing a web site on Internet that provides DRM information and a download button that enables a user to buy DRM information related with the selected source data through download.

If on-line purchase of DRM information is not made (S15), the system controller 5 examines PGCI, e.g., original PGCI, stored in the flash memory 7, including a single or plural pieces of CI associated with the selected source data (S16). Then, the system controller 5 knows where in the selected source data sample audio section or sections are (S17), based on the pair fields 'EP_DA_S_P' and 'EP_DA_E_P' or 'EP_DA_S_P' and 'DA_Dur' of the cell entry point information in CI.

Afterwards, the system controller 5 searches the DVD-RAM 1 for sample audio section pointed by the fields of the cell entry point information in CI through moving the optical pickup 2 inward and outward, and it reproduces only the sample audio section (S18). If the selected source data includes a plurality of audio tracks, the, system controller 5 reproduces sample audio section included in each track sequentially.

Consequently, a user can determine whether or not to buy play-authorizing information for source data after pre-listening or previewing respective partial audio song or movie recorded on a recording medium without purchasing play-authorizing information.

If there is DRM information in the management area of the DVD-RAM 1 or in the flash memory 7 (S13), the system controller 5 examines PGCI in the flash memory 7, including a single or plural pieces of CI associated with the selected source data (S20). Then, the system controller 5 knows where each audio track of the selected source data is, based on the fields 'A_C_S_P' and 'A_C_E_P' in each CI (S21) Afterwards, the system controller 5 searches for each audio track pointed by the two fields in CI, and reproduces the audio track or tracks (S22) sequentially until last audio track is encountered if several tracks are included in the source data.

If a user requests on-line purchase of DRM information in the situation that the play-error window has been displayed (S15), the system controller 5 reads from the management area of the DVD-RAM 1 or the flash memory 7 a URL (Uniform Resource Locator) information of a web site that provides DRM information for the selected source data and data identification, e.g., 2-byte serial number assigned to the source data downloaded to the DVD-RAM 1 or disk identification if the placed disk is read-only. The read address and data or disk identification are transmitted to the-connected PC (S30).

The above purchasing process is initiated by a user's clicking the 'download' button on the illustrative play-error window shown in FIG. 7.

The web site addressed by the stored URL identifies which DRM information is requested based on the received disk or data identification. Namely, it searches its database for DRM information linked with the received identification or serial number. If found, the web site downloads the found DRM information to the PC. The PC delivers the downloaded DRM information to the system controller 5 of the disk drive connected to the PC (S31). This DRM information delivery may be conducted in accordance with a protocol pre-specified between the web site and a PC connected to the web site.

The system controller 5 separates the received DRM information into play-authorizing information for each AOB or track, and stores them in the flash memory 7 or in the management information area of the DVD-RAM 1 in connection with respective track (S32). Afterwards, the system controller 5 reproduces entire selected source data written in the DVD-RAM 1 using the DRM information stored in the memory 7 or on the DVD-RAM 1 the same as explained above.

If a placed recording medium is read-only, the DRM information downloaded through the explained manner is stored in a memory of a disk drive.

In addition, if the above-explained method that reproduces entire source data or sample data thereof depending on existence of play-authorizing information is not embedded in a disk device, a program executing the method can be downloaded to the disk device from a web site providing the play-authorizing information and source data. Moreover, the program executing the method can be pre-recorded on a read-only recording medium.

The above-explained method is applicable to a variety of disks such as a compact disk (CD) and video CD besides read-only DVD and writable DVD. Further, the present method can be applied to moving-picture data and still-picture data, besides audio data.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of reproducing data from a recording medium, the method comprising:
   (a) checking whether there is play-authorizing information stored on the recording medium or in a device, the play-authorizing information allowing entire playback of recorded data, and the recorded data being reproduced only in accordance with the play-authorizing information;
   (b) reading location information pointing to a data section, which is a part of the recorded data, if there is no play-authorizing information and if an indication information specifies a presence of the location information, the data section being designated sample data for the recorded data and being reproducible without the play-authorizing information; and
   (c) reproducing the data section using the read location information, without the play-authorizing information.

2. The method of claim 1, wherein reading the location information of the data section occurs from management information for managing the recorded data.

3. The method of claim 1, wherein the recorded data is copy-protected data.

4. The method of claim 1, wherein the location information is specified only if the data section is present.

5. The method of claim 1, wherein the play-authoring information is purchasable from a provider.

6. A method of reproducing data, comprising:
(a) determining if play-authorizing information is present on a storage medium or in a device, if a position where sample data for content is present is specified based on an indication information, wherein the play-authorizing information is to authorize a playback of a stored content, and if the sample data being a part of the content is reproducible without the play-authorizing information; and
(b) reproducing the content in accordance with the play-authorizing information if the play-authorizing information is present, or reproducing the sample data using a location information for indicating the position if the position of the sample data is specified.

7. The method of claim 6, wherein the step (b) further comprises:
not permitting playback of the content if the play-authorizing information is not present.

8. The method of claim 6, step (b) reproduces the sample data in the position identified by the location information without the play-authorizing information if the play-authorizing information is not present and if it is determined that the position of sample data is specified as a result of step (a).

9. The method of claim 8, wherein the location information is specified only if the indication information specifies the position of the sample data.

10. The method of claim 9, wherein the location information comprises a start position of the sample data.

11. The method of claim 10, wherein the location information further comprises an end position of the sample data.

12. The method of claim 10, wherein the location information further comprises a duration of the sample data.

13. The method of claim 6, wherein the play-authoring information is key information for decrypting the content, and the play-authorizing information is obtainable from a provider.

14. The method of claim 6, wherein determining step (a) determines if the position where the sample data for the content is present is specified, in case that the play-authorizing information is not present on the storage medium or in the device.

15. The method of claim 14, wherein the step (b) reproduces the sample data only if it is determined that the position of the sample data is specified.

* * * * *